United States Patent [19]
Collier-Hallman et al.

[11] Patent Number: 6,002,226
[45] Date of Patent: Dec. 14, 1999

[54] BRUSHLESS DC MOTOR CONTROL METHOD AND APPARATUS FOR REDUCED COMMUTATION NOISE

[75] Inventors: Steven James Collier-Hallman, Frankenmuth; Julie Ann Kleinau, Bay City; Dennis B. Skellenger, Munger, all of Mich.

[73] Assignee: General Motors Corporation, Detroit, Mich.

[21] Appl. No.: 09/099,007

[22] Filed: Jun. 17, 1998

[51] Int. Cl.$^6$ .................................................. H01R 39/46
[52] U.S. Cl. .......................... 318/439; 318/254; 318/138; 318/139; 318/599; 318/432
[58] Field of Search .................................. 318/254, 138, 318/439, 139, 599, 432

[56] References Cited

U.S. PATENT DOCUMENTS

| | | | |
|---|---|---|---|
| 4,551,708 | 11/1985 | Welburn | 318/811 |
| 5,793,183 | 8/1998 | Carobolante et al. | 318/811 |

FOREIGN PATENT DOCUMENTS

| | | | |
|---|---|---|---|
| 0 659 629 A2 | 12/1994 | European Pat. Off. | B62D 6/08 |

OTHER PUBLICATIONS

Unitrode Integrated Circuits "Modelling, Analysis and Compensation of the Current–Mode Converter" U–97, undated.
Unitrode Integrated Circuits "Linear Integrated Circuits—Brushless DC Motor Controller IC" UC1625/UC3625 dated Dec. 5, 1988.
IEEE/KTH "Brushless DC Motors with Low Torque Ripple" by M. Lajoie–Mazenc, J.M. Vinassa, J. Cros, S. Astier Stockholm Sweden, Jun. 18–22, 1995.

*Primary Examiner*—Karen Masih
*Attorney, Agent, or Firm*—Edmund P. Anderson

[57] ABSTRACT

A brushless DC motor modifies motor commutation events to reduce noise by providing overlapping activation of the switch being deactivated with the switch being newly activated so that three switches are temporarily activated. The newly activated switch is pulse width modulated with a motor torque controlling duty cycle, and the switch being deactivated is pulse width modulated synchronously with the newly activated switch but with a duty cycle decreasing from the torque controlling duty cycle. The decreasing modulation of the switch being deactivated allows a slower current decrease in the phase turning off to reduce or eliminate the disturbances, and thus the noise. The decreasing modulation is preferably exponential in manner, with a time constant varying inversely with motor speed so that the duty cycle reaches a predetermined minimum in a predetermined maximum number of motor electrical degrees. The decreasing modulation may be switched on at low motor speeds where its noise reduction is required and switched off at higher motor speeds where the potential for interference with commutation is greater. The decreasing modulation is applicable in a dual switching mode in which each activated switch, except for the switch being deactivated in commutation, is pulse width modulated at the torque controlling duty cycle, or in a modified single switching mode in which the activated switch of one of the upper or lower groups is always closed continuously during its activation, except for commutation, during which the switch remaining on, which alternates between the groups, is closed continuously. Each mode of operation is applied in the motor speed/torque region to which it is best suited.

12 Claims, 8 Drawing Sheets

BRUSHLESS DC MOTOR CONTROL METHOD AND APPARATUS FOR REDUCED COMMUTATION NOISE

TECHNICAL FIELD

The technical field of this invention is the control of brushless DC motors, particularly for use in electric power steering systems.

BACKGROUND OF THE INVENTION

Figure 3:
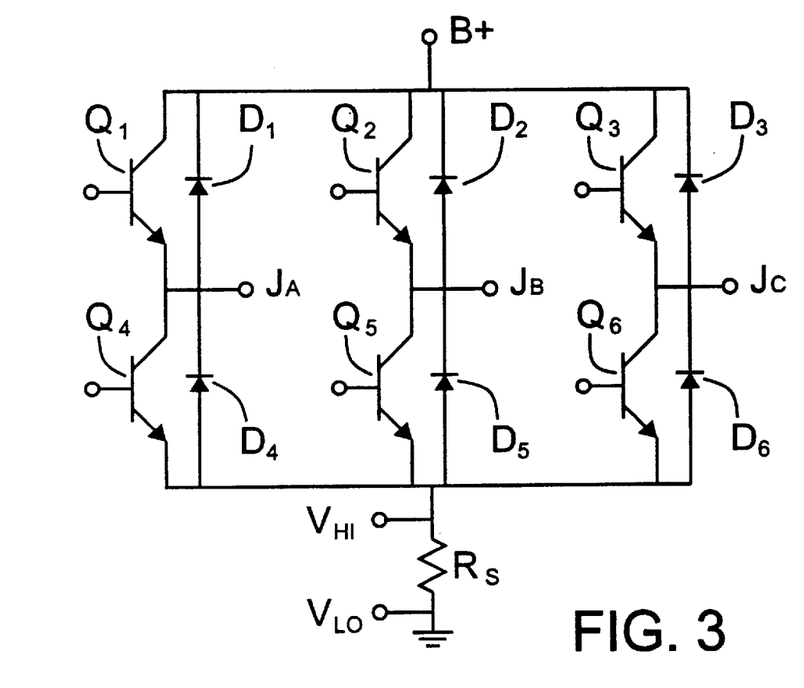
FIG. 3 is a circuit diagram of a bridge circuit for use in the controller of FIG. 2.
Figure 4:
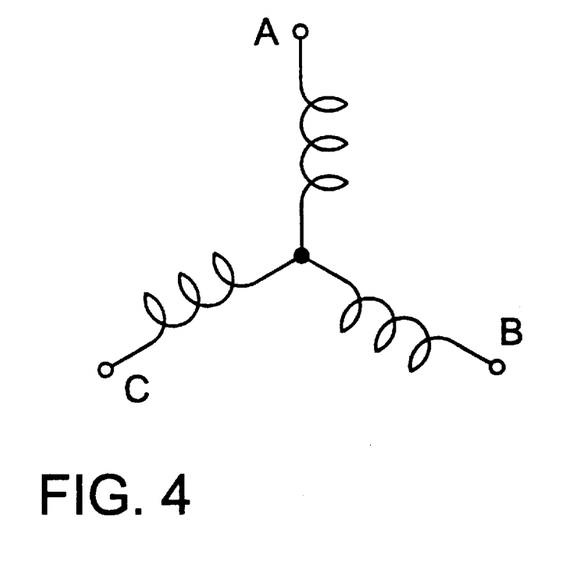
FIG. 4 is an equivalent electric circuit of an electric motor for use in the electric power steering system of FIG. 1 with the bridge circuit of FIG. 3.

A brushless DC motor requires electronic commutation of its armature currents. This is typically accomplished, for a trapezoidal back EMF, three phase motor, by means of a bridge switching circuit containing six semiconductor switches, as shown in FIG. 3 and 4. When a predetermined upper switch and non-series lower switch are simultaneously conducting, an armature current flows through two of the three phase windings in series to electromagnetically interact with the permanent magnet rotor and develop torque in a predetermined direction. Commutation to a different pair of armature windings is accomplished by turning off one of the switches and turning on a different non-series switch of the same level (upper or lower), with a control providing switching signals to the switch gates in the proper sequence and with the proper timing. Motor operation is thus controlled by activating the switches in a predetermined pattern.

The electric currents in the activated phases are controlled, usually by pulse width modulation at a higher frequency, to control motor torque. This modulation, in combination with the inductance of the windings, produces an average motor current, and thus a smooth motor torque, except during commutation. In traditional commutation, where the phases are turned off and on abruptly, the rise and fall of the phase currents are controlled only by the network properties of the motor and switching circuitry. The forcing function for the phase turning off is not the same as it is for the phase turning on, and one of the currents (rising or falling) will change faster than the other. The unequal current in the phase turning off and the phase turning on can produce a disturbance in the average motor current, and thus a variation in torque, at each commutation event; and such disturbances can drive the motor structure to generate audible noise. In some applications of such motors these noises may be objectionable. In particular, use of such a control and motor in an electric power steering system in modes of operation producing high phase currents at low motor speed can produce an annoying clicking noise at commutation, which may be termed "zipper noise." It is an object of this invention to control the phase currents of such a motor during commutation to reduce or eliminate such objectionable noise.

SUMMARY OF THE INVENTION

The motor control of this invention modifies motor commutation events to reduce noise by providing overlapping activation of the switch being deactivated with the switch being newly activated so that three switches are temporarily activated. The newly activated switch is pulse width modulated with a motor torque controlling duty cycle, and the switch being deactivated is pulse width modulated synchronously with the newly activated switch but with a duty cycle decreasing from the torque controlling duty cycle. The decreasing modulation of the switch being deactivated allows a slower current decrease in the phase turning off to reduce or eliminate the disturbances, and thus the noise. The decreasing modulation is preferably exponential in manner, with a time constant varying inversely with motor speed so that the duty cycle reaches a predetermined minimum in a predetermined maximum number of motor electrical degrees.

The decreasing modulation may be switched on at low motor speeds where its noise reduction is required and switched off at higher motor speeds where the potential for interference with commutation is greater. The decreasing modulation is applicable in a dual switching mode in which each activated switch, except for the switch being deactivated in commutation, is pulse width modulated at the torque controlling duty cycle. The decreasing modulation is alternatively applicable in a modified single switching mode in which the activated switch of one of the upper or lower groups is always closed continuously during its activation, except for commutation, during which the switch remaining on, which alternates between the groups, is closed continuously. The control is preferably responsive to motor current and/or motor speed to apply each switching mode in the motor speed/torque region to which it is best suited. Preferably, control stability is improved by a sample/hold circuit and a motor speed controlled variable forcing function generator to augment a sensed current feedback signal during the portion of a commutation event in which the early opening of one of the switches causes current to recirculate in the bridge and not be sensed by the current sensor.

DESCRIPTION OF THE PREFERRED EMBODIMENT

Figure 1:
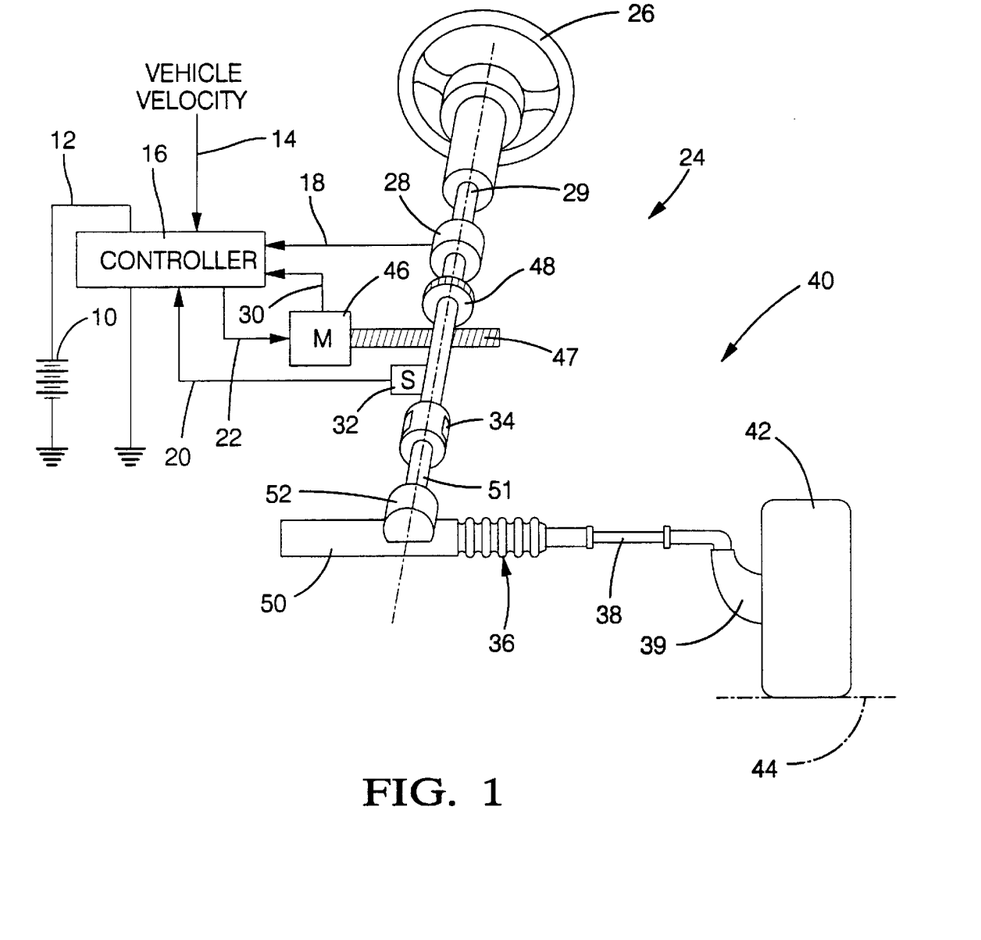
FIG. 1 shows an electric power steering system which provides an environment for the apparatus of this invention.

Referring to FIG. 1, a motor vehicle 40 is provided with an electric power steering system 24. Electric power steering system 24 may comprise a conventional rack and pinion steering mechanism 36, which includes a toothed rack 50 and a pinion gear (not shown) under gear housing 52. As a hand wheel 26 is turned by a vehicle operator, an upper steering shaft 29 turns a lower shaft 51 through a universal joint 34; and lower steering shaft 51 turns the pinion gear. Rotation of the pinion gear moves the rack, which moves tie rods 38 (only one shown), which move steering knuckles 39 (only one shown) to turn steering wheels 42 (only one shown).

Electric power assist is provided through a controller 16 and a power assist actuator comprising an electric motor 46. Controller 16 receives electric power from a vehicle electric power source 10 through a line 12, a vehicle speed signal on line 14, and a steer angle signal from a rotational position sensor 32 on line 20. As hand wheel 26 is turned, a torque sensor 28 senses the torque applied to hand wheel 26 by the vehicle operator and provides a handwheel torque signal to controller 16 on line 18. In addition, as the rotor of motor 46 turns, rotor position signals for each phase are generated within motor 46 and provided over bus 30 to controller 16. In response to the vehicle velocity, operator torque, steering pinion gear angle and rotor position signals received, controller 16 derives desired motor phase currents and provides such currents through a bus 22 to motor 46, which supplies torque assist to the steering shaft 29, 51 through worm 47 and worm gear 48. If torque sensor 28 is the type which requires upper steering shaft 29 to be separated at the sensor between upper and lower sections allowing some range of rotational independence, both rotational position sensor 32 and worm gear 48 are associated with the lower section of the steering shaft, below torque sensor 28 as shown.

Figure 2:
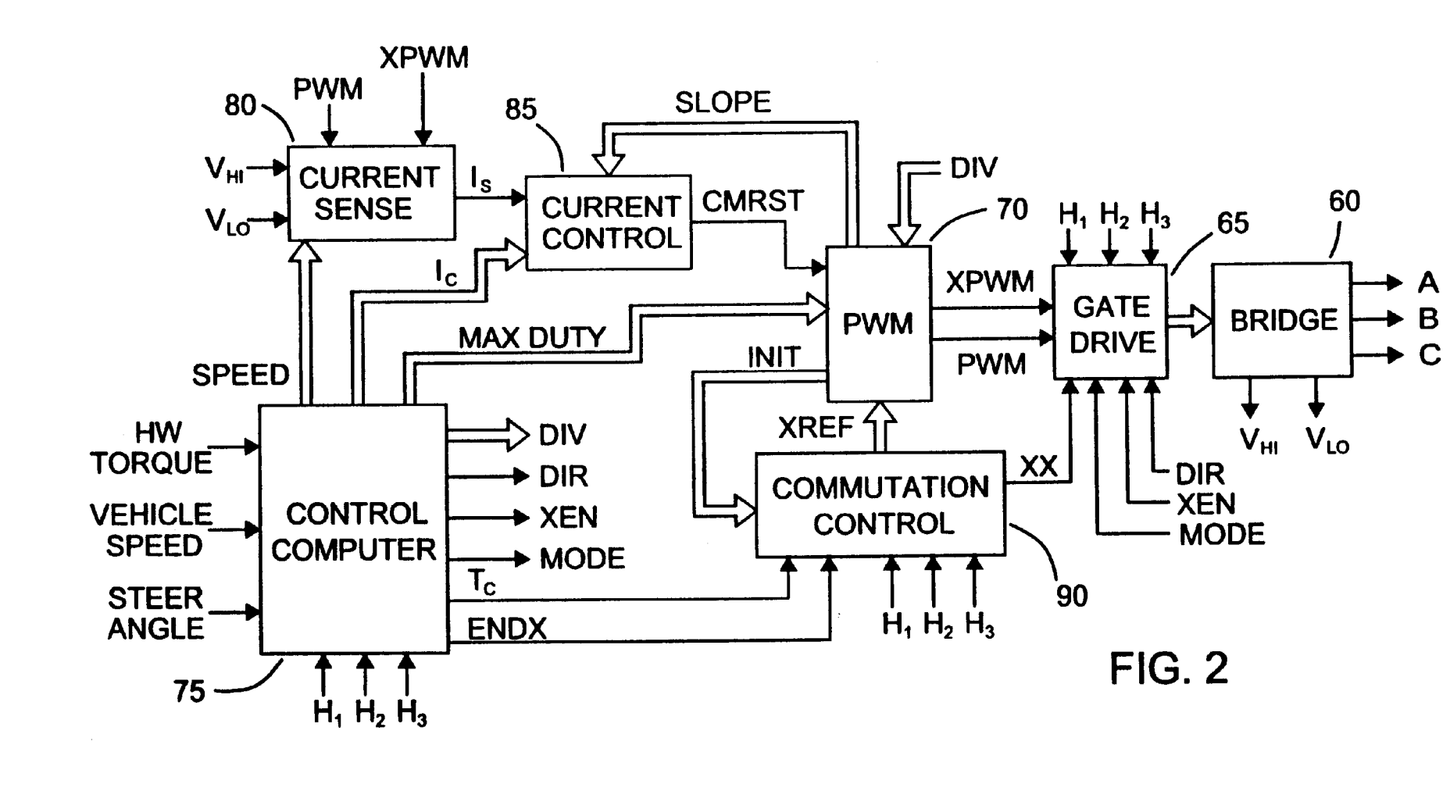
FIG. 2 shows a block diagram of an embodiment of a controller for use in the electric power steering system of FIG. 1.

FIG. 2 shows a block diagram of controller 16. A standard six-switch bridge circuit 60, shown in more detail in FIG. 3, switches armature current to the wye connected motor phase windings, shown in FIG. 4. A gate drive 65 provides gate switching signals to the control gates of the switches in bridge circuit 60 in response to certain input signals. Gate drive 65 receives two pulse width modulated voltage signals PWM and XPWM from a PWM circuit 70, shown in more detail in FIG. 5. Gate drive 65 also receives commutation initiating signals $H_1$, $H_2$ and $H_3$ from Hall effect rotor position signal generators in motor 46 and a decreasing modulation timing signal XX from a commutation control 90. Gate drive 65 further receives a switching mode control signal MODE, a motor direction control signal DIR and a decreasing modulation enable signal XEN from a control computer 75.

Figure 6:
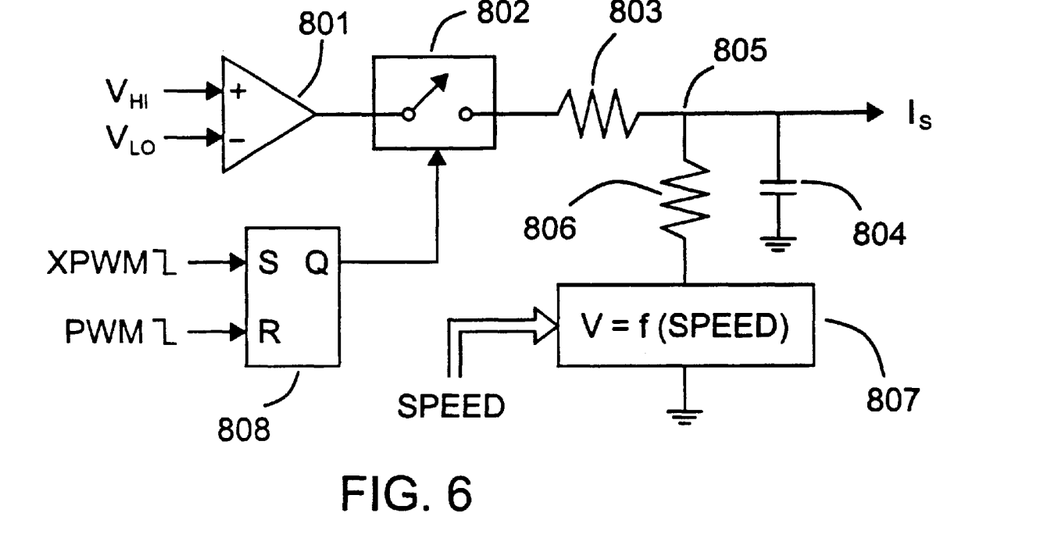
FIG. 6 is a circuit and block diagram of a current sense circuit for use in the controller of FIG. 2.

A current sense circuit 80, shown in more detail in FIG. 6, receives current sense signal voltages $V_{HI}$ and $V_{LO}$ from a current sense resistor $R_S$ in bridge circuit 60 and, with the assistance of a special sample and hold circuit, provides an output motor current signal $I_S$. Current sense circuit 80 also receives signals PWM and XPWM from PWM circuit 70 and a signal SPEED from control computer 75. A current control circuit 85, shown in more detail in FIG. 7, receives the motor current signal $I_S$ from current sensor circuit 80, a current command signal $I_C$ from control computer 75 and a signal SLOPE from PWM circuit 70 and provides an output timing signal CMRST to PWM circuit 70. Commutation control circuit 90 provides an output timing signal XREF to PWM circuit 70 in response to an input initial value signal INIT from PWM circuit 70, a time constant signal $T_C$ and a modulation end signal ENDX from control computer 75, and the commutation initiating signals $H_1$, $H_2$ and $H_3$ from motor 46. Commutation control circuit 90 further provides the signal XX to gate drive circuit 65. Control computer 75 includes a digital computer programmed for control of motor 46. Although not shown, standard oscillator based circuitry provides a basic clock signal CLK for synchronous operation of control computer 75 and the other digital circuitry. Control computer 75 receives the input vehicle speed, handwheel torque, steer angle and motor position ($H_1$, $H_2$ and $H_3$) signals previously mentioned, and derives from these and certain predetermined constants the commanded motor current $I_C$, as well as the following other output signals: (1) a motor speed signal SPEED; (2) a reference count MAX DUTY for pulse width modulation; (3) a motor direction signal DIR; (4) a commutation mode signal MODE; (5) a decreasing modulation enable signal XEN; (6) a decreasing modulation time constant $T_C$; (7) a decreasing commutation end reference count ENDX; and (8) a count divider number DIV.

FIG. 3 shows a circuit diagram of a typical bridge circuit comprising six semiconductor switches Q1–Q6 with associated parallel fly-back diodes D1–D6. The switches may be transistors, FETs or similar semiconductor switching devices, and the diodes may be built into the switches in a manner known in the art. Each of switches Q1–Q3, which may be called "upper" switches, is connected in series with one of switches Q4–Q6, which may be called "lower" switches, across a voltage regulated, DC electric power source B+ and a series current sensing resistor $R_S$, with the junction of each pair of upper and lower series connected switches connected to a different one of the three motor phase winding terminals in the wye connected motor armature windings. In particular, junction $J_A$ of switches Q1 and Q4 is connected to terminal $P_A$ of motor phase winding A; junction $J_B$ of switches Q2 and Q5 is connected to terminal $P_B$ of motor phase winding B; and junction $J_C$ of switches Q3 and Q6 is connected to terminal $P_C$ of motor phase winding C. The diodes, being connected in parallel with the switches, are similarly connected with respect to the motor phase winding terminals.

Current in the motor phase windings is provided by activating an upper switch and a non-series lower switch to close a circuit with the DC electric power source, two phase windings and current sensing resistor $R_S$ in series. The motor phase windings are electronically commutated to produce motor operation in a predetermined direction of rotation by changing the activated pairs of closed switches in a predetermined pattern well known in the art. Motor currents in the armature phase windings are also controlled by pulse width modulating (PWM) the activated switches at a frequency higher than that of the commutation. This PWM switching can be done in several different ways, which results in several different modes of operation of the bridge circuit.

In a first mode of operation, which may be termed dual switching mode, pulse width modulation is provided by switching both the upper and lower activated switches together in the standard manner except during commutation. During commutation, three switches are activated. The newly activated switch on the same level (upper or lower) as the switch being deactivated is pulse width modulated together in the standard manner with the switch on the other level that remains activated; but the switch being deactivated is also pulse width modulated, each pulse of the deactivating switch being initiated synchronously with the others but varying from the others in duration with a controlled, decreasing duty cycle. The preferred manner of decrease in duty cycle of the deactivating switch is exponential, since this tends to produce a linear decrease in current. The newly activated switch is alternated between the upper and lower groups. The pattern shown produces motor rotation in a predetermined direction; the pattern for motor rotation in the opposite direction would be apparent to one of ordinary skill in the art.

Figure 9:
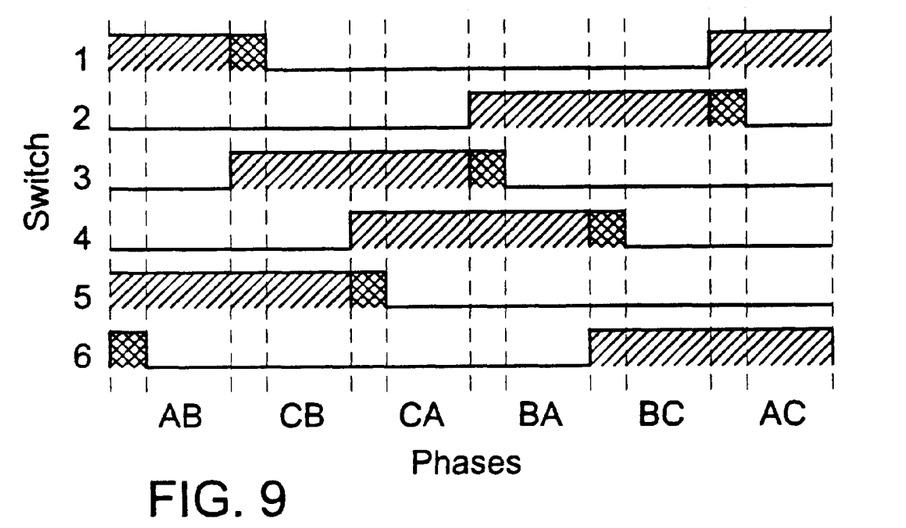
FIG. 9 shows timing diagrams illustrating the operation of the controller of FIG. 2 in a first mode.

An example of operation in dual switching mode is described with reference to FIG. 9. The condition of each of switches 1–6 is shown throughout one complete electrical cycle of the motor. For each switch, an activated condition is shown high and an inactivated condition is shown low. While each switch is activated, standard pulse width modulation is shown with single direction cross-hatching and decreasing pulse width modulation is shown with double direction cross-hatching. The non-commutating periods of motor operation (AB, CB, . . . ) are shown separated by unlabeled commutation periods, the duration of latter being exaggerated for clarity. During the non-commutating period AB, upper switch Q1 and lower switch Q5 are activated and pulse width modulated together until commutation. During the following commutation period, upper switch Q3 becomes activated and is pulse width modulated with lower switch Q5; but the pulse width modulation of switch Q1, although continuing with pulses initiated synchronously with the others, is given a decreasing duty cycle. When the decreasing duty cycle of switch Q1 is ended, the switch is deactivated to end the commutation period. The next non-commutating period CB is similar, but with switches Q3 and Q5 pulse width modulated together until the next commutation period, during which Q4, the next switch turning on, is pulse width modulated with switch Q3, the switch remaining on, and Q5, the switch turning off, is pulse width modulated with a decreasing duty cycle. The pattern repeats with appropriate switches activated and modulated as shown in FIG. 9 to complete a cycle through additional non-commutating periods CA, BA, BC and AC and the associated commutation periods.

In a second mode of operation, which may be termed modified single switching mode, pulse width modulation is provided by switching only the upper activated switch, leaving the lower activated switch continuously on, except during commutation. During commutation, three switches are activated: the newly activated switch (upper or lower) is pulse width modulated; the switch remaining activated is turned on continuously, and the switch being deactivated is pulse width modulated with pulses being initiated synchronously with the standard pulses but having a duration varying with a controlled, decreasing duty cycle. The term "modified" in modified switching mode thus refers to the fact that, although during the non-commutating periods the lower activated switch is always left continuously on, during commutation the switch left continuously on alternates between an upper switch and a lower switch. Thus, operation during commutation is symmetric between the upper and lower switches. This is different from the traditional single switching mode of the prior art, in which the lower activated switch is always left on continuously and modulation is always applied to the upper activated switch.

Figure 10:
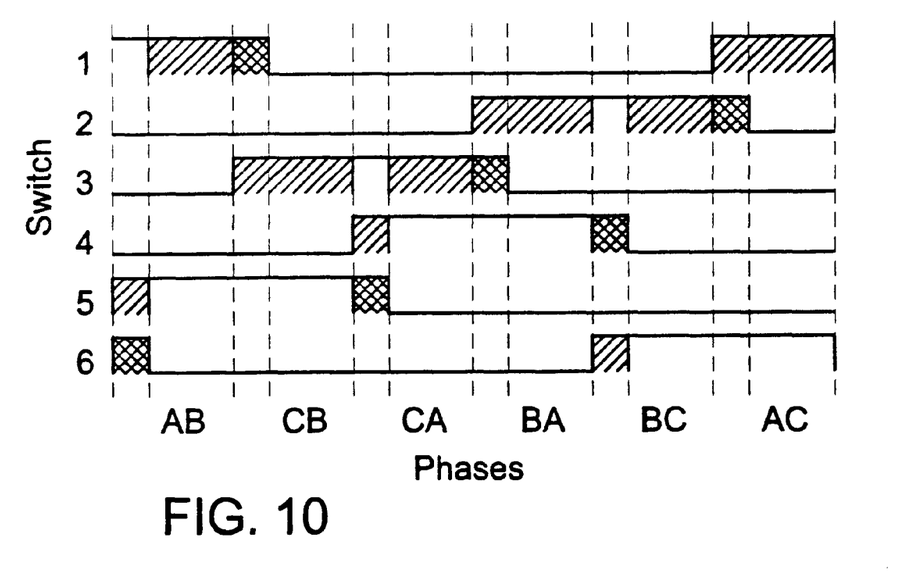
FIG. 10 shows timing diagrams illustrating the operation of the controller of FIG. 2 in a second mode.

An example of operation in modified single switching mode is described with reference to FIG. 10. During the non-commutating period AB, upper switch Q1 and lower switch Q5 are activated, with upper switch Q1 being pulse width modulated and lower switch Q5 continuously on until commutation. During the following commutation period, upper switch Q3 becomes activated and is pulse width modulated, lower switch Q5 remains continuously on and deactivating switch Q1 is pulse width modulated synchronously with a controlled, exponentially decreasing duty cycle. During the next non-commutating period CB, upper switch Q3 is pulse width modulated and lower switch Q5 remains continuously on. During the following commutation period, lower switch Q4 becomes activated and is pulse width modulated during the commutation period, upper switch Q3 is turned on continuously for the commutation period and the deactivating switch Q5 is pulse width modulated synchronously with switch Q4 but with a controlled, exponentially decreasing duty cycle. During the next non-commutating period CA, lower switch Q4 is turned on continuously while upper switch Q3 is pulse width modulated. The pattern repeats with appropriate switches activated and modulated as shown in FIG. 10 to complete a cycle through additional non-commutating periods BA, BC and AC and the associated commutation periods.

The inventors of this apparatus and method have found that a controlled, decreasing modulation of the switch in the phase turning off can effectively control the change in phase currents in the motor during commutation to eliminate the objectionable "zipper" noise. Thus, controller 16 provides a controlled, decreasing pulse width modulation of the switch turning off, beginning synchronously with the first PWM pulse of the switch turning on following a change in one of the rotor position signals $H_1$, $H_2$ and $H_3$. This decreasing modulation is preferably exponential, since such variation tends to produce a linear reduction in current. It begins with the duty cycle in effect at the beginning of commutation and is terminated at a predetermined percent (e.g. 10%) of the maximum duty cycle, since it is not changing much at this level and smaller duty cycles are not easy to maintain in a stable manner. The rate of decrease is also varied inversely with motor speed to maintain a predetermined maximum number of electrical degrees (e.g., 6) duration, so as to ensure that the modulation does not overlap commutation events. In addition, it is preferably turned off at high motor speeds to avoid potential commutation problems. This is permissible, since the "zipper" noise which the decreasing modulation is designed to eliminate is not a problem at high motor speeds (e.g., above 1,000 RPM).

Figure 5:
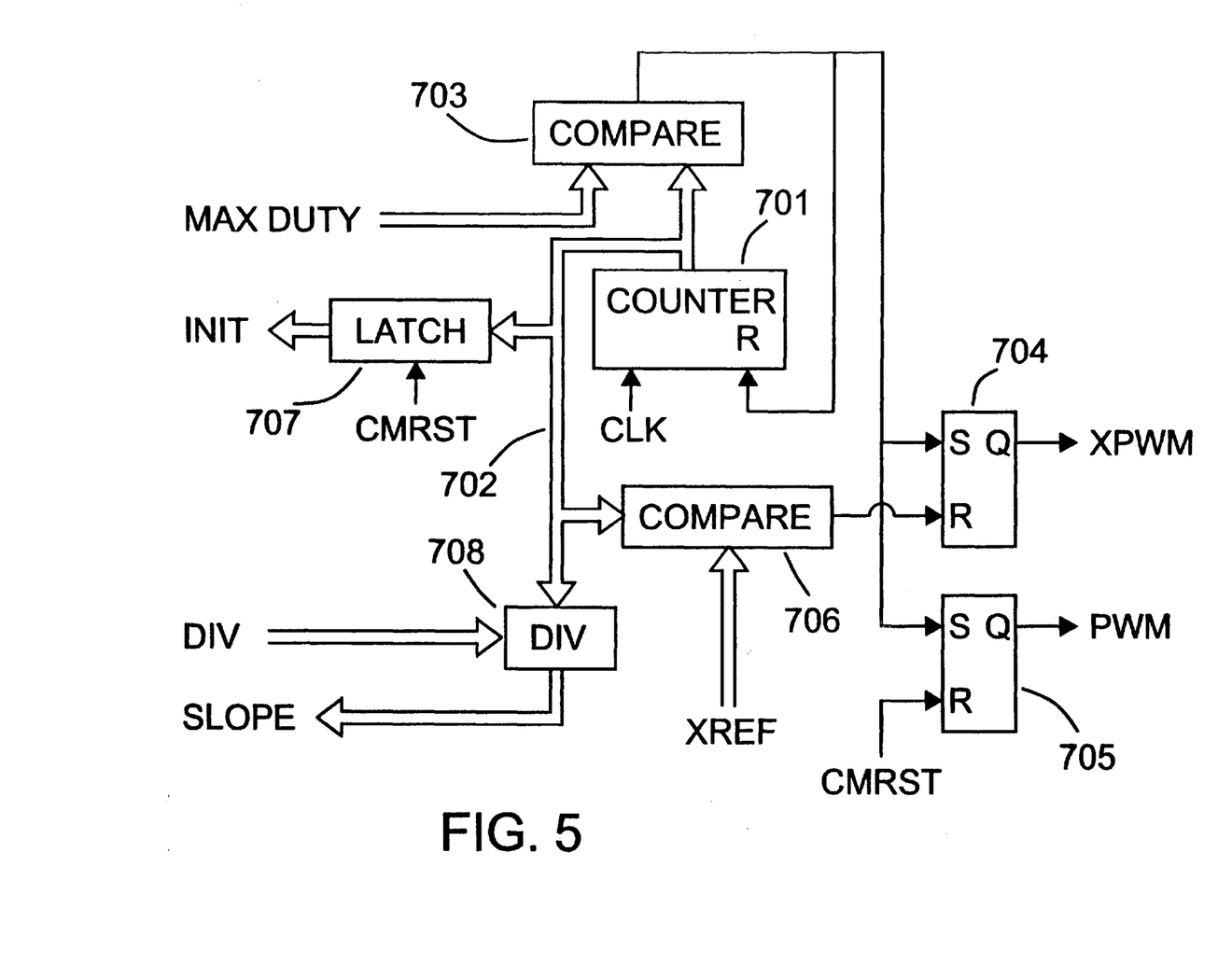
FIG. 5 is a block diagram of a PWM circuit for use in the controller of FIG. 2.

PWM Circuit 70 generates a standard pulse width modulated signal waveform PWM and an exponentially decreasing pulse width modulated signal waveform XPWM, both of which are provided to Gate Drive Circuit 65 to help produce the required switching of semiconductor switches Q1–Q6. As seen in FIG. 5, PWM circuit 70 is based on a counter 701, which counts clock pulses provided in a clock input CLK and outputs each new count on a digital bus 702. A digital comparator 703 receives this count on bus 702 and compares it with a reference count MAX DUTY, provided by control computer 75 and representing the maximum value of PWM (100 percent duty cycle). When the count equals MAX DUTY, comparator 703 outputs a pulse to a reset input R of counter 701 to begin a new count, as well as to the set inputs of flip-flops 704 and 705. Flip-flop 704 provides output signal XPWM, and flip-flop 705 provides output signal PWM; thus, the latter two signals are synchronized at the beginning of each pulse.

The reset input of flip-flop 704 receives the output of a digital comparator 706, which compares the count on bus 702 with an input reference count XREF and generates a pulse when they are equal to cause the end of each pulse in the XPWM signal waveform. The value of XREF is zero, thus providing no XPWM pulses, except during commutation. During commutation it is initialized at a value causing the first pulse of XPWM to have the same duty cycle as that of PWM and then decreases exponentially to cause the duty cycle of XPWM to similarly decrease exponentially.

The reset input of flip-flop 705 could be also provided with a reset pulse from a digital comparator in this circuit. But, for reasons which will become more apparent at a later point in this description, a comparison is performed in analog circuitry in current control 85, which generates a signal CMRST (current mode reset) for application to the reset input of flip-flop 705 to cause the end of each pulse in the PWM signal waveform.

PWM circuit 70 also generates some signals for other circuits in controller 16. The count on bus 702 is latched into a latch 707 by signal CMRST, which latch then contains a digital count INIT which represents the current duty cycle of the PWM signal waveform. The value INIT is provided to commutation control circuit 90 to determine the initial value of the exponentially decreasing modulation, as will be described at a later point in this description. The count is also divided in a divider 708 by an input binary number DIV to produce a divided count SLOPE used for slope compensation Signal XREF, which produces the exponentially decreasing modulation in signal waveform XPWM, is generated by commutation control circuit 90, which is described with reference to FIG. 8. Basically, this circuit generates a signal which is initiated at the beginning of commutation with an initial value INIT equal to the present duty cycle of signal PWM and which decreases to a predetermined value at a predetermined rate. Since an exponential decrease is preferred, a low pass filter is used in this embodiment. The exponential decay is preferably controlled to reach a final value corresponding to a predetermined percentage of 100 percent duty cycle in a predetermined maximum safe number of electrical degrees so that it does not interfere with the next commutation event.

Figure 8:
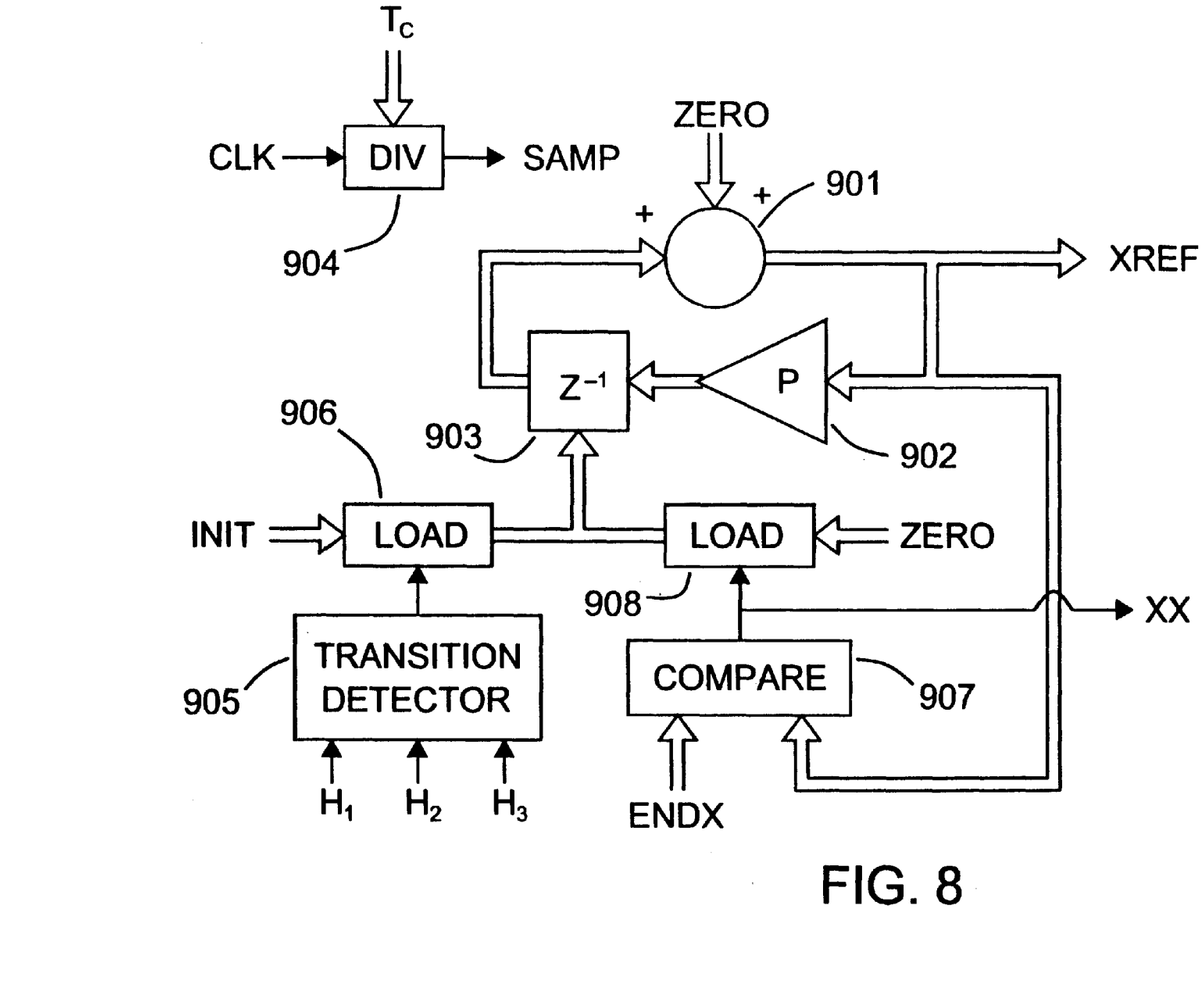
FIG. 8 is a block and schematic diagram of a commutation control circuit for use in the controller of FIG. 2.

Referring to FIG. 8, summer 901, amplifier 902 and delay register 903 are connected in a standard single low pass, digital filter loop with a digital pole P and a time constant controlled by the sample or clock rate. The summer has two inputs: the filter input itself and a delayed and scaled feedback of the output XREF. But delay register 903 can be loaded at any time with an externally supplied digital number, and the filter input to summer 901 is a constant zero. Thus, when a new number is loaded into delay register 903, output XREF will decrease from that number at a predetermined exponential rate. Since the rate of decrease depends both on the gain of amplifier 903 (filter pole) and the sampling rate of the filter (time constant), it can be controlled by varying either or both. In this embodiment, the amplifier gain P is constant (e.g., 127/128) and the sampling rate (time constant) is varied by dividing the clock signal CLK in DIV circuit 904 by time constant value $T_C$, which is provided from control computer 75 as a function of motor speed. The output SAMP of DIV circuit 904 is a divided clock signal used as a clock signal in the filter loop of elements 901–903 in place of signal CLK to control the filter sampling rate.

The filter action is started by loading the value INIT, from PWM circuit 70, into delay register 903; and it is stopped by loading the value zero in delay register 903. Additional circuitry is provided for this purpose. A transition detection circuit 905 receives the commutation initiating signals $H_1$, $H_2$ and $H_3$ from motor 46 and signals the initiation of each commutation event to a load register 906, which loads the value of INIT into delay register 903 in response. The filter thus outputs a value of XREF which is initially equal to INIT and exponentially decreases from that value over time. The output of summer 901 is also provided to one input of a comparator 907 having another input provided with a number ENDX from control computer 75. ENDX is a constant representing a predetermined percentage of the maximum duty cycle MAX DUTY. When XREF falls to the level of ENDX, an output signal from comparator 907 to a load register 908 causes the number zero to be loaded into delay register 903, and XREF goes to zero.

Figure 7:
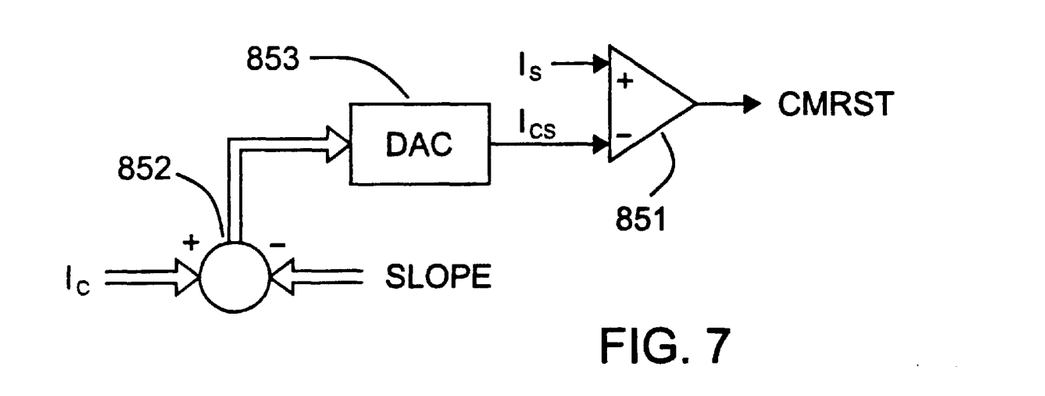
FIG. 7 is a block diagram of a current control circuit for use in the controller of FIG. 2.

Motor current is controlled by current control circuit 85, a circuit shown in block diagram form in FIG. 7. An analog comparator 851 generates the current mode reset signal CMRST to end a pulse of signal waveform PWM when the rising sensed current signal $I_S$ equals a slope compensated desired current signal $I_{CS}$. Signal $I_{CS}$ is derived by a digital summer 852, which subtracts the value SLOPE from the value of desired current $I_C$, and digital-to-analog converter (DAC) 853, which converts the value of $I_{CS}$ to an analog signal. The slope compensation used in this apparatus is an application of a standard technique for the improvement of current loop stability in pulse width modulated, current mode power supplies to reduce potentially noise producing sub-harmonic oscillations in which the reference voltage used to determine the duty cycle is given a compensating downward slope rather than being held constant. In this circuit, the decreasing value of SLOPE, generated in PWM circuit 70, provides the The motor current signal $I_S$ is derived in current sense circuit 80, which is shown in FIG. 6. Analog voltage signals $V_{HI}$ and $V_{LO}$ from current sense resistor RS in bridge circuit 60 are provided to the inputs of an operational amplifier 801, which provides an output voltage signal of their difference. This difference voltage is proportional to the motor current that flows through resistor $R_S$, but it is not responsive to a portion of the motor current which recirculates through the fly-back diodes without flowing through resistor $R_S$. This will occur during commutation, for example, when an upper switch remains on while a lower switch is turned off, and vice versa.

The situation may be explained with reference to FIG. 3 and 11. For example, during a commutation in dual switching mode, upper switch Q1 is being deactivated and upper switch Q3 activated while lower switch Q5 remains activated. Both switches Q1 and Q3 begin the commutation event with the same duty cycle, since this is the initial value Q1's decreasing modulation. Thus, during the initial pulse of the commutation event, all three switches operate at the same PWM duty cycle and all phase currents flow through sense resistor $R_S$. But as the duty cycle of switch Q1 decreases during the commutation event, switch Q1 opens before Q3 by increasingly greater periods. When switch Q1 opens with switches Q3 and Q5 closed, the current through phase windings A and B in series, which had been flowing from B+ to ground through switches Q1 and Q5 can no longer flow through switch Q1. But the inductance of phase windings A and B will provide a forcing voltage to maintain current flow of phase winding A through switch Q5 and fly-back diode D4. Since this current does not flow through sense resistor $R_S$, the sensed current will drop to a lower level than the total motor current actually is.

Figure 11:
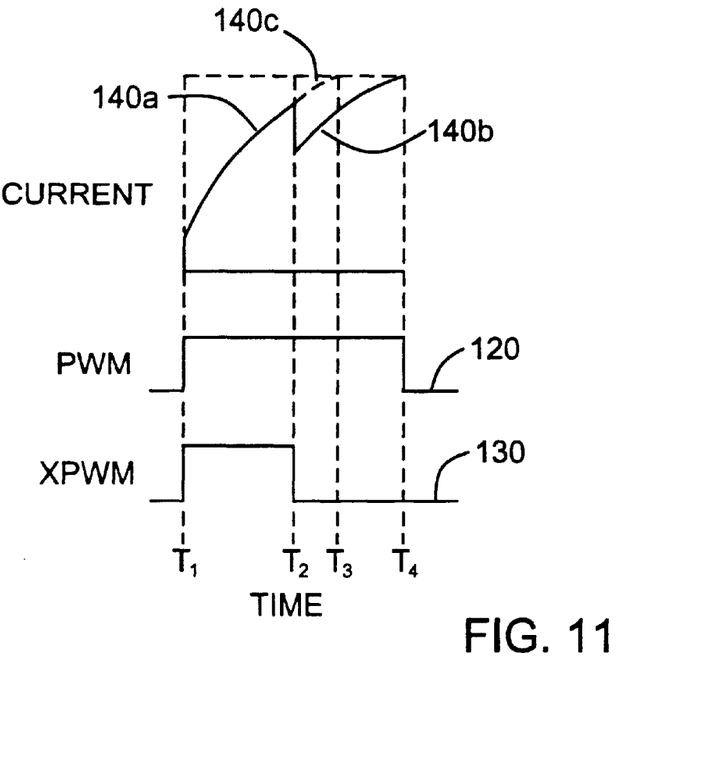
FIG. 11 shows timing and current diagrams useful in illustrating the operation of the current sense circuit of FIG. 6.

FIG. 11 shows, in solid lines, XPWM pulse 130, the current 140a, 140b sensed by sense resistor $R_S$ and the PWM pulse 120 that would result if a signal of this current were output as signal $I_S$. The indicated motor current, represented by line 140a, begins at time $T_1$, and rises until time $T_2$, when switch Q1 opens, and then drops to a lower value, as a portion of the motor current is diverted from current sense resistor $R_S$, before rising again. Dashed line 140c shows the actual current, which would otherwise reach the reference level at time $T_3$. The sensed current, following line 140b, does not reach the reference level until time $T_4$. With reliance placed entirely on the current sense resistor, the drop in indicated current would thus delay the current mode reset signal CMRST and thus lengthen the present PWM pulse, as shown by PWM pulse 120. This can lead to sub-harmonic oscillations and noise at fractions (½, ⅓ . . . ) of the PWM switching frequency. Although the PWM switching frequency is out of the audible range, some of the lower, sub-harmonic frequencies are within the audible range, and the noise is audible.

To prevent such noise, current sense circuit 80 includes sample/hold and voltage forcing circuitry. An analog switch on the output of operational amplifier 801 is controlled by signal HOLD to remain closed during the initial rise of each pulse and open when the period of recirculating current begins. Signal HOLD is provided by a flip-flop 808 which has a set input triggered by the falling edge of signal XPWM, which indicates the opening of the deactivating switch, and a reset input triggered by the falling edge of PWM, which indicates current mode reset; and switch 802 responds to signal HOLD to open during the period between these two falling edges.

The output of analog switch 802 is connected through a resistor 803 and capacitor 804 in series to ground; and the junction 805 of the resistor and capacitor is the output of current sense circuit 80. Junction 805 is also connected through a resistor 806 to a controlled voltage source 807, which receives a control signal SPEED from control computer 75. The resistance of resistor 806 is much greater than that of resistor 803; and controlled voltage source 807 is thus effectively isolated from capacitor 804 while analog switch 802 is closed. During the initial current rise, therefore, the voltage on capacitor 804 rises with the output of operational amplifier 801. But when analog switch 802 opens, capacitor 804 becomes isolated from operational amplifier 801 and, rather than drop with the indicated current, continues under control of controlled voltage source 807, which sources current to or sinks current from capacitor 804 depending on the value of its own voltage relative to that on the capacitor. The signal SPEED which sets the voltage of controlled voltage source 807 is derived by control computer 75, for example in a look-up table, from the speed of motor 46. Typically the voltage of controlled voltage source 807 is greater than that on capacitor 804 at the opening of analog switch 801, and the voltage on capacitor 804 continues to rise, providing an estimate of the actual motor current. Thus, referring again to FIG. 11, the actual output $I_S$ of current sense circuit 80 after the opening of switch Q1 at time $T_2$ approximately follows dashed line 140c and ends the PWM pulse approximately at the correct time $T_3$.

Gate drive circuit 65 has an output connected to the control gate of each of semiconductor switches Q1–Q6 in bridge circuit 60. Each of the outputs of gate drive circuit 65 is provided with one of four possible signals: (1) continuous deactivation (signal low, switch open in this embodiment), (2) continuous activation (signal high, switch closed in this embodiment), (3) signal PWM, or (4) signal XPWM. These signals are directed to the proper outputs at the proper times for desired motor operation in response to a plurality of input control signals comprising (1) commutation initiation signals $H_1$, $H_2$ and $H_3$ from motor 46, (2) MODE, direction (DIR) and decreasing modulation enable (XEN) signals from control computer 75, and (3) signal XX from commutation control circuit 90. The decreasing modulation enable signal (XEN) determines if the operation will use decreasing modulation or if it will be traditional brushless motor control with abrupt switching; and the latter logic and operation are well known in the prior art. The MODE signal determines whether dual switching mode or single switching mode will be used; and, in any case, the direction signal DIR picks the logic for left or right motor operation. It should be noted that, when decreasing modulation is not used, single switching mode is the traditional mode in which the activated switch that is kept closed is always from the same group (usually the lower).

The commutation initiation signals $H_1$, $H_2$ and $H_3$ each have two states, one for each 180 degrees of an electrical cycle for that phase. Thus, there are eight possible combinations of these signals, six of which are used to signal commutation events. Preferably, the signal generation is set up so that combinations 1,1,1 and 0,0,0 are reserved for error indication, as known in the art. Each of the other six combinations causes a change to a new set of output signals to the six semiconductor switches, beginning with the next PWM pulse. In dual switching mode, this is all that is required, since it is not necessary to signal the end of commutation. For example, referring to FIG. 9, the combination of signals $H_1$, $H_2$ and $H_3$ indicating the beginning of commutation to phase AB would cause the logic to provide signal PWM to switches Q1 and Q5, signal XPWM to switch Q6 and continuous deactivation (low in this embodiment) to switches Q2, Q3 and Q4 to produce the commutation period. At the end of the commutation period, the only switch that must change is switch Q6, but signal XPWM, already applied to this switch, provides this change itself as it goes low for the remainder of the phase. A similar pattern exists for each of the other five phases in the motor electrical cycle.

In modified single switching mode, however, an additional signal is required to mark the end of commutation. Referring to FIG. 10, at the end of the same commutation event initiating phase AB, switch Q5 must change from the torque controlling PWM waveform to continuous activation (signal high, switch closed) for the remainder of the phase. But signal XPWM itself goes low at this point. In addition, at the end of the same commutation event switch Q1 must change from continuous activation (signal high, switch closed) to the torque controlling PWM waveform for the remainder of the phase. Therefore, in this embodiment, gate drive 65 must itself generate these changes by changing the signal applied to switch Q5 from PWM to continuous activation and changing the signal applied to switch Q1 from continuous activation to PWM in response to a signal of the end of the commutation period. This is similarly true for the other five phases of the motor electrical cycle. The signal of the end of the commutation period might be derived within gate drive 65 from signal XPWM itself, but in this embodiment it is derived in commutation control circuit 90 from the output of comparator 907, which changes state to cause the end of the decreasing modulation. This signal, labeled signal XX herein, is provided to gate drive circuit 65 for this purpose, in this and the other 5 phases of the motor electrical cycle.

The control described above is preferably provided by hard-wired logic circuitry in a custom digital chip derived from the information herein in a manner known in the art; and such derivation would be a straightforward task well within the capability of one of ordinary skill in the art of design of motor controls.

During the off periods of each pulse width modulation cycle in dual switching mode, the motor current recirculates through the low side and high side fly-back diodes. The decay of inductive current is fairly rapid since the forcing function is large: negative battery voltage plus two diode drops. Due to this rapid decay, a significant amount of slope compensation is required for current control loop stability. In modified single switching mode, however, recirculation of motor current is only through a single fly-back diode; and the forcing function is only a single diode drop. The delay of inductive current is thus much less rapid, and significantly less slope compensation is required. Since the use of decreasing modulation makes the loop less stable, more slope compensation is required, and the system is less efficient, especially in dual switching mode, since it is already less stable before the decreasing modulation is applied. Therefore, modified single switching mode is the desired operating mode of the apparatus of this invention. In addition, the smaller ripple currents of this mode generate less radiated electromagnetic interference (EMI). But modified single switching mode has its own problems in some areas of particular concern in an electric power steering system. In modified single switching mode, small currents cannot be attained due to the preloading effects of the recirculating currents; but dual switching mode can accurately control low currents. In addition, torque in motor quadrant II operation, where motor torque is opposed to motor direction, is not constant with motor speed in modified single switching mode but is fairly constant in dual switching mode; and this allows smooth and stable rapid steering reversals.

Figure 12:
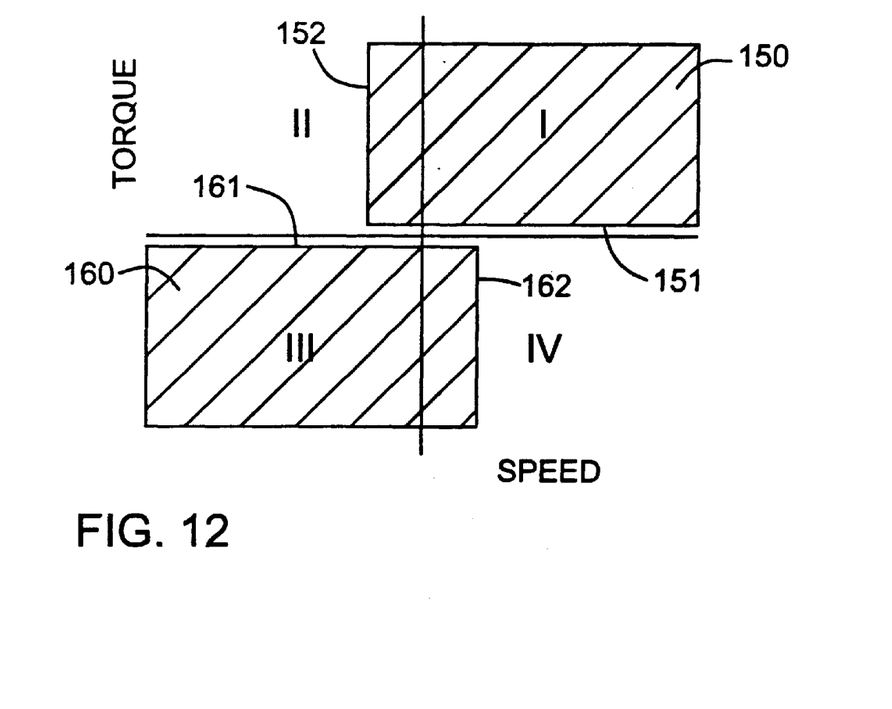
FIG. 12 shows a torque/speed map illustrating the areas of application of the first and second modes of the controller of FIG. 2.

Thus, the apparatus of this embodiment uses both modes, each in the area of electric power steering operation in which it provides the greatest advantage. The mode is determined by control computer 75 as a function of the motor operating point, as shown with respect to the motor speed/torque map shown in FIG. 12. Modified single switching mode is used in a region 150 (cross-hatched in FIG. 12) above a predetermined positive torque (current) magnitude 151 and to the right of a predetermined negative motor speed magnitude 152 in the upper half of the plane comprising quadrants I and II and a correspondingly defined region 160 below a predetermined negative torque (current) magnitude 161 and to the left of a predetermined positive motor speed magnitude 162 in the lower half of the plane comprising quadrants III and IV. Elsewhere, dual switching mode is used. Thus, the more stable modified single switching mode is used throughout quadrants I and III except where low currents are unattainable and also in quadrants II and IV at low motor speeds where steering reversals are acceptable in this mode. Dual switching mode is used where it is needed to attain low currents and during high speed steering reversals. Control computer 75 may use the desired motor current signal $I_C$ as indicative of motor current or torque and may derive a motor speed signal by determining the time duration between changes in the combination of commutation initiation signals $H_1$, $H_2$ and $H_3$ from motor 46. Such derivation introduces minimum time delay and is thus able to respond to quick changes in motor speed. In addition, the use of the time duration, actually an inverse motor speed signal, provides maximum resolution at low motor speeds where "zipper" noise is objectionable. In response to the torque and speed values thus derived, control computer 75 compares the operating point of motor 46 to the map shown in FIG. 12, determines the desired mode with hysteresis applied to prevent mode cycling, and sends the desired MODE signal to gate drive circuit 65. The comparison may be accomplished in a number of ways, including but not restricted to storing calibrated numbers representing the speed and torque lines 151, 152, 161 and 162 and comparing the derived varying values thereto.

Control computer 75 derives commanded current $I_C$ and motor direction DIR according to any one of many electric power steering controls known in the art from whatever parameters the chosen control requires: e.g. vehicle speed, handwheel torque and steer angle. Motor speed may be derived directly from the time between changes in the status of motor position signals $H_1$, $H_2$, and $H_3$. MAX DUTY and ENDX are programmed into control computer 75 as predetermined constants. MODE is determined as described above. DIV, which determines the slope compensation, is determined in a known manner except that separate calibrations are provided for the different modes in response to the MODE signal. The decreasing modulation enable signal XEN is determined at least in response to motor speed to enable at low speeds where "zipper" noise is a problem and disable at higher speeds where it might interfere with commutation. The time constant $T_C$ of decreasing modulation is derived as a function of motor speed to provide a modulation decrease which is essentially constant in terms of electrical degrees.

We claim:

1. A method for providing activation with reduced commutation noise of a brushless DC motor having a stator with three phase armature windings and a permanent magnet rotor, the activation using a bridge switching circuit comprising first and second groups of three switches each, each switch of the first group being connected in series with a different one of the switches of the second group across a source of electric power with a junction of each pair of series connected switches also being connected to a different one of the three phase armature windings, each of the switches being a semiconductor switch having a parallel fly-back diode, the method comprising:

repeatedly activating selected switches of the first group with selected non-series connected switches of the second group to connect selected pairs of the three phase windings in series with the electric power source in a predetermined commutation pattern to provide torque producing phase currents in the windings of the motor, the commutation pattern defining commutation events in which a switch of one of the first and second groups is deactivated, a new switch of the one of the first and second groups is activated and a switch of the other of the first and second groups remains activated, the newly activated switch alternating in consecutive commutation events between the first group and the second group; and in each commutation event, providing overlapping activation of the switch being deactivated with the switch being newly activated and the switch remaining activated for the duration of the commutation, the newly activated switch being pulse width modulated with a motor torque controlling duty cycle and the switch being deactivated being pulse width modulated with pulses initiated synchronously with those of the newly activated switch but with a duty cycle decreasing from the torque controlling duty cycle.

2. The method of claim 1 in which the switch remaining activated is pulse width modulated synchronously during each commutation event with the switch being newly activated at the motor torque controlling duty cycle.

3. The method of claim 1 in which the switch remaining activated is closed continuously during each commutation event.

4. The method of claim 1 in which, except during commutation events, the activated switches of the first group are pulse width modulated at the torque controlling duty cycle and the activated switches of the second group are continuously closed.

5. The method of claim 1 in which the motor is operated alternatively in a single switching mode in which the switch remaining activated is closed continuously during activation or a dual switching mode in which the switch remaining activated is pulse width modulated synchronously with the switch being newly activated at the motor torque controlling duty cycle and in which the motor is changed between the single switching mode and the dual switching mode in response to a signal varying with motor torque.

6. The method of claim 5 in which the motor is changed between the single switching mode and the dual switching mode in further response to a signal varying with motor speed.

7. The method of claim 1 in which the duty cycle of the switch being deactivated is decreased continuously through the commutation event from the torque controlling duty cycle to a predetermined minimum duty cycle in a predetermined number of electrical degrees of the motor.

8. The method of claim 1 in which the duty cycle of the switch being deactivated is decreased in an exponential manner.

9. The method of claim 8 in which the time constant of the exponential decrease is varied inversely with vehicle speed to produce a predetermined minimum duty cycle over a predetermined maximum number of electrical degrees of the motor.

10. The method of claim 1 in which the overlapping activation of the switch being deactivated with the switch being newly activated and the switch remaining activated for the duration of the commutation event is provided at low motor speeds where the commutation noise is most audible and not provided at high motor speeds where it may interfere with commutation.

11. An electromechanical activation apparatus comprising, in combination:

A source of DC electric power;

a brushless DC motor having a stator with three phase armature windings and a permanent magnet rotor;

a bridge switching circuit comprising first and second groups of three switches each, each switch of the first group being connected in series with a different one of the switches of the second group across the source of electric power with a junction of each pair of series connected switches also being connected to a different one of the three phase armature windings, each of the switches being a semiconductor switch having a parallel fly-back diode;

first control means for repeatedly activating selected switches of the first group with selected non-series connected switches of the second group to connect selected pairs of the three phase windings in series with the electric power source in a predetermined commutation pattern to provide torque producing phase currents in the windings of the motor, the commutation pattern defining commutation events in which a switch of one of the first and second groups is deactivated, a new switch of the one of the first and second groups is activated and a switch of the other of the first and second groups remains activated, the newly activated switch alternating in consecutive commutation events between the first group and the second group; and second control means for, in each commutation event, providing overlapping activation of the switch being deactivated with the switch being newly activated and the switch remaining activated for the duration of the commutation, the newly activated switch being pulse width modulated with a motor torque controlling duty cycle and the switch being deactivated being pulse width modulated with pulses initiated synchronously with those of the newly activated switch but with a duty cycle decreasing from the torque controlling duty cycle.

12. A method for providing activation with reduced commutation noise of a brushless DC motor having a stator with three phase armature windings and a permanent magnet rotor, the activation using a bridge switching circuit comprising first and second groups of three switches each, each switch of the first group being connected in series with a different one of the switches of the second group across a source of electric power with a junction of each pair of series connected switches also being connected to a different one of the three phase armature windings, each of the switches being a semiconductor switch having a parallel fly-back diode, the method comprising:

repeatedly activating selected switches of the first group with selected non-series connected switches of the second group to connect selected pairs of the three phase windings in series with the electric power source in a predetermined commutation pattern to provide torque producing phase currents in the windings of the motor, the commutation pattern providing periods in which a switch of the first group and a switch of the second group are simultaneously activated separated by commutation events in which a switch of one of the first and second groups is deactivated in a controlled manner, a new switch of the one of the first and second groups is activated and a switch of the other of the first and second groups remains activated, the newly activated switch alternating in consecutive commutation events between the first group and the second group;

between commutation events, pulse width modulating the activated switch of the first group while maintaining the activated switch of the second group continuously closed;

in each commutation event, regardless of whether an activated switch is in the first group or the second group, pulse width modulating the newly activated switch with a motor torque controlling duty cycle, maintaining the switch remaining activated in a continuously closed state and controlling the switch being deactivated in a predetermined, commutation noise reducing manner for the duration of the commutation event.

* * * * *